UNITED STATES PATENT OFFICE.

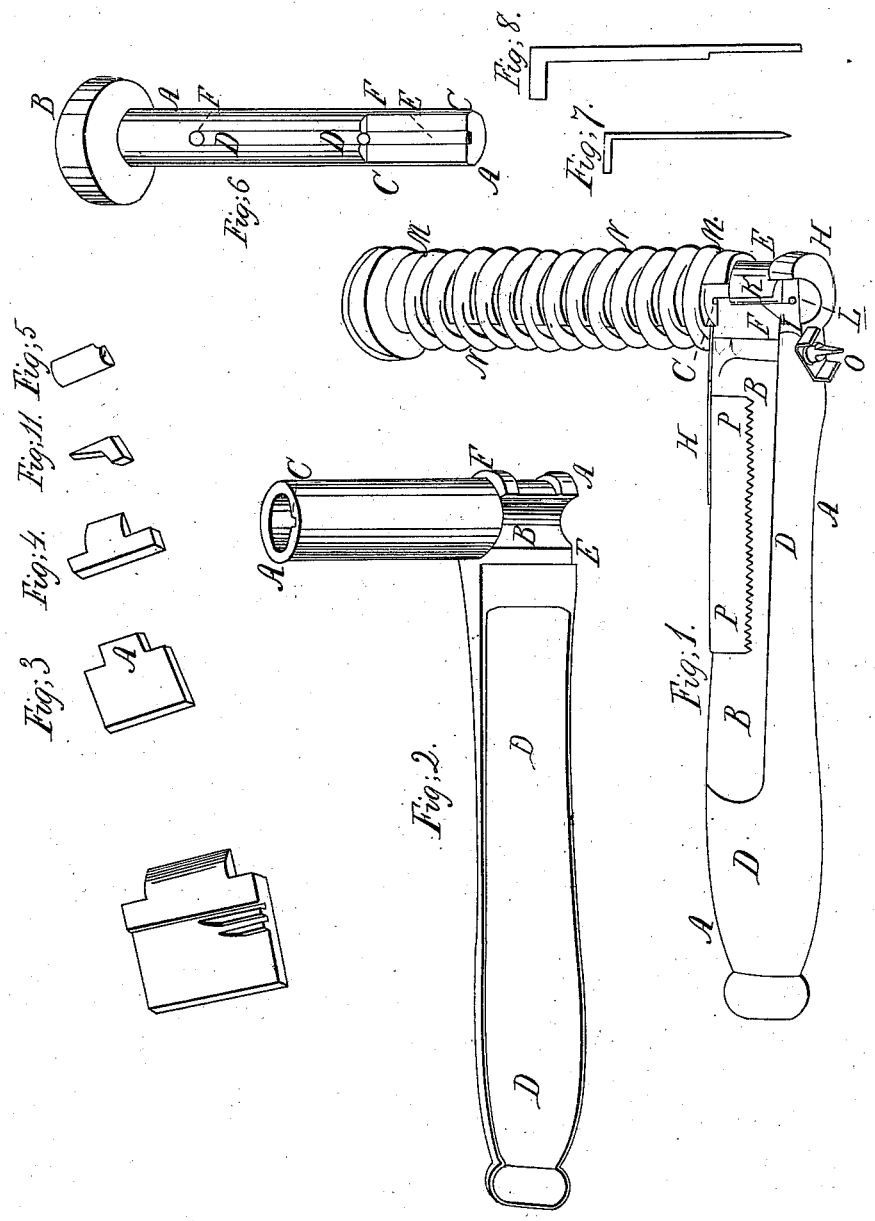

JOHN C. BRIGGS, OF SARATOGA SPRINGS, NEW YORK.

PEGGING-MACHINE.

Specification of Letters Patent No. 4,228, dated October 9, 1845.

*To all whom it may concern:*

Be it known that I, JOHN C. BRIGGS, of Saratoga Springs, in the county of Saratoga and State of New York, have invented a new and Improved Mode of Driving Pegs in Boots and Shoes; and I do hereby declare that the following is a full and exact description.

The machine consists of the following parts viz, handle, cylinder, steel part, awl-haft, awl, peg-driver, and movable shoulder. I will proceed to describe the construction and combination of these parts. The handle is 5 inches long of a suitable size and shape so as to be grasped firmly and easily in the hand, the general shape of it is round and somewhat ovate, one extremity is ,6 (the figures I use denote inches and when marked with a comma tenths of an inch) in diameter, thence increasing it reaches its greatest size at the end of 2 inches where it is 1 in diameter, thence it diminishes slightly till at the end of 4 its diameter is ,8, thence through the 5th inch it preserves the same thickness but assumes a square shape. On this square end is fixed the cylinder perpendicularly to the axis of the whole handle and to two of the planes of the square end and so that the axes of the handle and cylinder cut each other. This cylinder is ,8 in diameter, the sides ,2 thick, leaving the bore ,4 in diameter and 2,4 long. It is fixed on so that one end is even with that which is to be the lower side of the handle, and the other end stands above that which is to be the upper side of the handle. This is the general shape of the handle and cylinder, but to obtain the particular or real shape a part of what I have described above must be taken away. The part of the handle to be removed can be described as the part contained in the right angle of two planes cutting it as follows. Make the cylinder vertical and direct the handle toward your left. (I suppose them in this position through the whole description.) Then the first of these two planes will be a vertical one, the upper edge of it commencing, two inches from the end toward your left, in the surface immediately over the axis of the handle, and following the surface, passes toward the cylinder in such a direction as to strike into the cylinder on the side of the axis toward you at a distance of 3/20 from it. The lower edge of this plane commences in the axis of the handle 2 from the left end and as it passes toward the cylinder constantly depresses and where it enters the cylinder is only ,1 from the bottom of the handle. This lower edge of the first plane lies in the second plane which is perpendicular to the first and indefinitely extended. Now taking away the part of the handle contained between these planes on the side toward you and rounding a little the sharp corners thus made you have the actual shape of the handle. A, A, Figure 1, of the annexed drawings represents the whole handle and B, B, the vertical plane surface made by the section of the vertical plane I have described.

The part of the cylinder to be taken away is contained in the right angle made by the vertical plane already described, supposing it to terminate in the line in which it meets the inside surface of the cylinder after having passed through a part of the vacant space within, and another perpendicular to this meeting it in its line of termination. Take out the part contained in the angle of these planes on the side toward you, leaving a large opening, you have the particular shape of the cylinder, Fig. 2, A, A, show the whole cylinder and B the opening made by the section of the planes. To finish the cylinder there is a groove cut on the inside reaching from the top of the opening to the top of the cylinder (Figs. 1 and 2, C), it is 1/20 deep and ,1 wide, is parallel to the axis of the cylinder and in such a position that a line drawn from the axis of the cylinder perpendicular to the vertical plane of the handle would strike the middle of the groove. This whole cylinder together with the half of the handle on the side from you I have cast in one entire piece of brass, this half of the handle being hollowed out as much as possible on the inside for the sake of making the machine light (D, D, Fig. 2). The whole of Fig. 2 represents this single piece of brass. The remainder of the handle I usually make of wood, shaping it so as to fill the hollow in the brass part and also to give the handle the particular shape described above (Fig. 1, B, B, D D).

The steel part occupies the opening in the cylinder seen vacant in Fig. 2—B but filled up in Fig. 1 by the steel part E. This part is made up of four pieces. The first piece is nearly square being ,8 from top to bottom ,6 from left to right and ,1 thick (Fig. 3). There is a projection on the middle of the right side of ,2 by ,4 extension along the side (Fig. 3 A). This piece is laid in the opening of the cylinder so that the outer surface of it shall be even with the vertical plane surface of the handle (Fig. 1, F), the projection on the right side being fitted into a notch previously filed in the brass (Fig. 1 E), and the left side being embedded in a depression left for the purpose when the handle and cylinder were cast (Fig. 2 E). The second piece is now fastened upon the first by riveting—its length is the same as that of the first and it must be so placed that the surface of the left face of it shall be even with the surface of the right side of the groove of the cylinder. It is ,1 thick, its width being such as to reach back to the brass and also to cover the projection of the first piece (Fig. 4 and Fig. 1 H H).

The third piece is a chisel ,3 long perfectly straight on one side. This is brought to be parallel with the left face of the second piece ,1 from it, the left side coming up obliquely meeting this side at the top forms the edge of the chisel. The bottom of it is enlarged for the sake of making it easier to fasten it upon the first piece which is done in the same manner as the second, the bottom even with the bottom of the first piece, the thickness of it is ,1 (Fig. 11 and Fig. 1 I).

The fourth is a simple piece of steel ,5 long by ,3 wide and 1/20 thick, flat on one side and rounded on the other so that the two long edges of it and one of the short ones are sharp. This piece is fastened upon the second upon its flat side so that one edge projects ,1 meeting the chisel and running above it, the short sharp edge being lowest that is ,1 from the bottom of the chisel and second piece (Fig. 5 and Fig. 1 K). These four pieces of the steel part as they are now put together form a square passage each side of which is ,1 across (Fig. 1 L). This part being done it is fastened in its place by putting a rivet through the left side of the first piece and the handle and by heading the brass down on it on the right.

The three parts now combined I call, the frame.

The awl-haft I turn out of a piece of iron or steel making a shaft 2,7 long and nearly ,4 in diameter (Fig. 6 A A) with a head on one end 1,1 in diameter rounded on that which is to be the upper surface and flat on that which is to be the lower or that from which the shaft proceeds, its greatest depth is ,3 (Fig. 6 B). Now, if this shaft be inserted in the top of the cylinder it will slide smoothly down till it comes in contact with the steel part which occupies a part of the bore. I now file off enough from the shaft to permit it to pass by the steel part till the lower end comes even with the bottom of the handle. The cut must be 3/20 deep and ,8 long from the lower end (Fig. 6 C, C). The shaft can now pass clear down only when it is in one particular position. I next cut a groove in the shaft which shall precisely correspond to the groove of the cylinder when the shaft is in said position, being of the same length and width, its depth however is 3/20. I now bore a hole in each end of this groove through the shaft and then from the lower hole cut another groove straight to the end of the shaft, it is of the same width as the other but is only ,1 deep, that is ,1 below the flat surface made by the cutting of the file.

In Fig. 6, D D represent the first groove and E E the second and F F the two holes. This second groove I fill with the shank of the pegging awl, the top of it being bent over and inserted in the lower hole (Fig. 7). It reaches below the shaft about the length of the pegs used. This lower part of it is of the shape of common awls.

The peg-driver is made of steel shaped so as to fill the upper hole and first groove of the shaft and rises above the surface of the shaft enough so as to fill also the groove of the cylinder. It reaches down to the end of the shaft, being one tenth square for the last ,8 of its length (Fig. 8) and the outside or back of it straight.

Both the awl and driver are fitted in their places loosely so as to be easily taken out to change the awl when a larger or smaller one is required. The shanks of the awls are all of the same size. With the awl and driver in their places insert the shaft again in the cylinder, the driver following and filling the groove of the cylinder passes down and enters the square passage formed by the four pieces of the steel part and when it is quite down entirely fills this passage, the end of it being even with the end of the shaft and bottom of the steel part and handle: the awl now stands out its whole length below the bottom of the handle.

The spring consists of coiled iron wire, the coils being of such a diameter to just slip easily over the outside of the cylinder except the lowest one which hugs tight around the cylinder resting on the handle and a ridge 3/20 square running around the cylinder even with the top of the handle (Fig. 2 F), and the upper one which is wound so small as to hug tightly the shaft of the awl-haft close under the head. These two tight coils prevent the awl-haft from raising too high or ever falling out when the machine is turned over yet they do not hold it so tightly but that it may be pulled out with the fingers. (Fig. 1 M M these two coils and N N the whole spring.) The spring is made of such size and length of wire as to have these two qualities, first, that when the awl-haft is pressed down the coils will come together and rest upon each other just when the ends of the shaft and driver are even with the bottom of the handle not permitting them to descend any farther; secondly, that when the pressure is taken off the spring will restore the awl-haft to such a position that the lower ends of the driver and shaft shall be just even with the top of the steel part.

The movable shoulder consists of a thin piece of brass ,2 wide and ,7 long, ,1 of each end being turned up square and a hole bored for the screw ,1 nearer one end than the other. A thumb-screw, ,6 long ,2 of which is made up by the head shaped suitably to be turned by the fingers, leaving the screw of it ,4 long, is passed through the hole in the brass piece then screwed into a hole previously made in the solid brass of the handle just where it is joined to the cylinder on the bottom (Fig. 1, O). By loosening and tightening this screw either end of the brass piece can be turned toward the place where the awl comes down and fastened there at pleasure.

Having now described all the parts of the machine and their combinations I will now proceed to describe the mode of operating—first fix the shoe firmly in a machine used by shoe peggers called pegging jack—take a slip of common peg wood such as is produced by peg factories in the operation of making single pegs, being one peg thick and containing 20 or 50 pegs ready sharpened, lay this upon the vertical plane surface of the handle with the sharpened ends down (Fig. 1, P P). Now grasp the handle of the machine in your left hand so that the thumb shall bear upon the slip of peg-wood to hold it in its place or move it as may be required—bring the movable shoulder in contact with the edge of the sole of the shoe, the handle being held perpendicular to the edge of the sole and the cylinder resting vertically upon the sole—holding the machine in this position with the left hand, take a mallet in the right hand and strike a blow upon the head of the awl-haft sufficiently heavy to bring the awl-haft down as low as the spring will permit it to go—the awl is now of course forced its whole length into the sole—but as the mallet is taken off, the spring immediately restores the awl-haft to its former position; thus extracting the awl from the sole; there is now a vacant hole left in the sole; now move the machine from you, taking care to keep the shoulder in contact with the edge of the sole, till you see the hole just made appear in the lower end of the square passage; (Fig. 1 L). At the same time with the left thumb slide along the slip of peg-wood till the first peg of it comes in contact with the second piece of the steel part under the projection of the fourth piece. Now strike another blow as before. As the driver descends, the end of it immediately strikes upon the top of the first peg, presses it down upon the top of the chisel, splits it off from the rest of the slip, drives it through the square passage and forces it into the hole previously made—there is also by this second blow a new hole made, go on repeating the same operation and by each blow of the mallet after the first a new hole will be made and a peg driven in the previous one. After having pegged one row around the sole, you can peg another the right distance from this by turning the shoulder half way around and proceeding as before.

I do not wish to be limited by the precise terms of the above description in the following cases viz. First, as to size. The machine I have described will answer for pegs of any length less than ,5 but for pegs any longer than ,5 some deviations must be made from the terms of the above description and to drive the largest size of pegs used would require a machine made larger and stronger every way. I do not wish then to be limited as to size any further than this that they shall all be convenient to be held in the left hand both in size and weight. Second, as to materials of which some parts of it are made. The metallic half of the handle and cylinder may be cast of iron, the awl-haft may be turned out of steel and the spring made of steel or brass wire. Third, the handle may be cast entire and solid without any wood being used, then the cylinder and whole handle would be one piece of metal.

What I claim as my invention and desire to secure by Letters Patent, is:

The combination of the handle (A A, Fig. 1,) and the cylinder (A A, Fig. 2,), part of each of which being removed, in the manner and of the shape described in the above specification, for the purpose of receiving the slip of pegs, and to be held therein and conveniently to be advanced, by means of the thumb of the hand holding the implement, toward the chisel (I, Fig. 1 and Fig. 11,) which successively splits off the single pegs from the slip (P P, Fig. 1,); said handle and cylinder being constructed either of one entire piece of suitable metal; or—to render the implement less weighty—part of the handle may be made of wood, in the manner fully described above, which latter mode of construction is considered preferable.

JOHN C. BRIGGS.

Witnesses:
 A. BOCKES,
 M. McKEMON.